Patented June 17, 1941

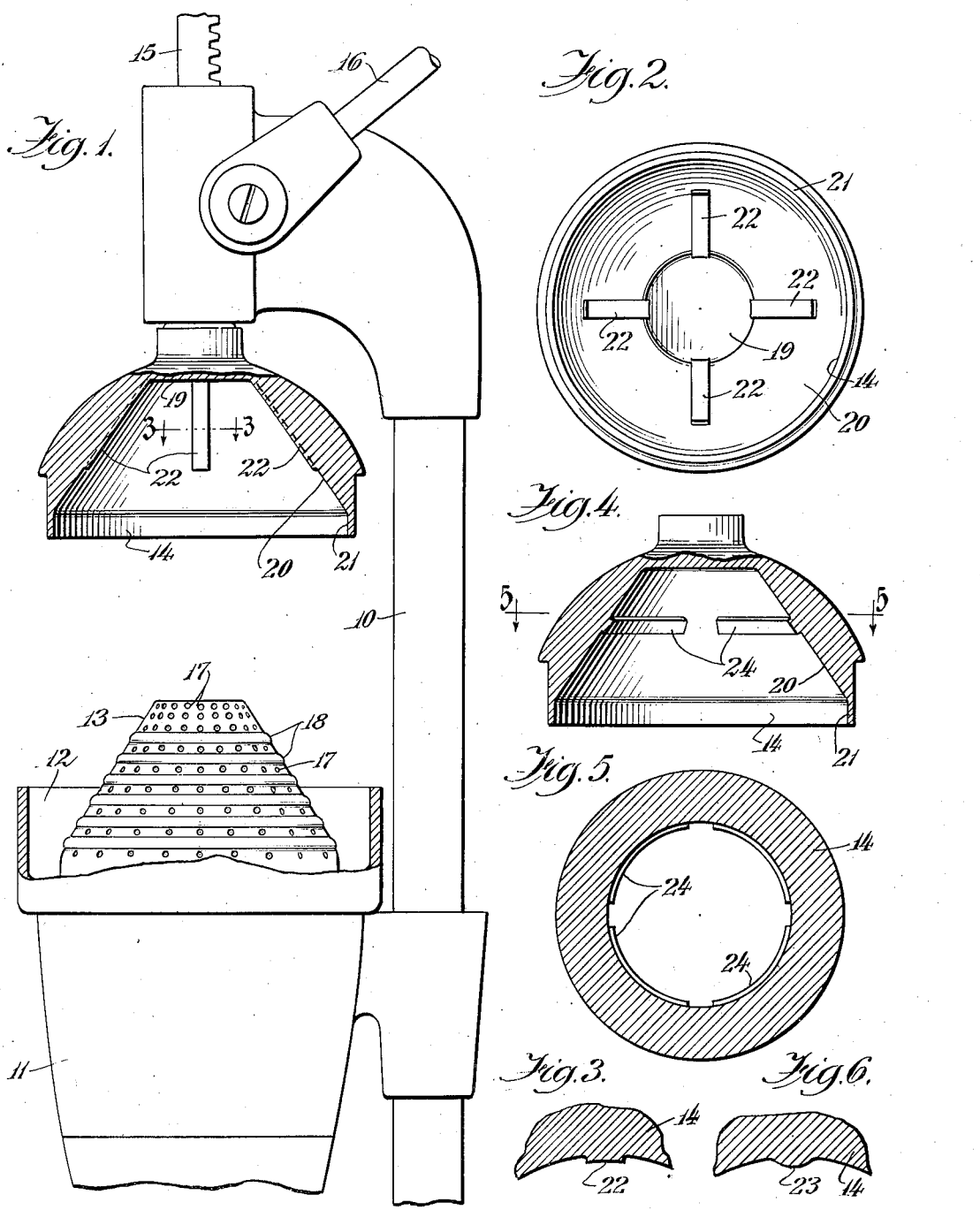

2,245,726

UNITED STATES PATENT OFFICE 2,245,726

FRUIT JUICE EXTRACTOR PRESSURE CUP

Arthur W. Seyfried, Racine, Wis., assignor to Scovill Manufacturing Company, Waterbury, Conn., a corporation of Connecticut Application August 7, 1939, Serial No. 288,749

2 Claims. (Cl. 100—49)

This invention relates to fruit juice extractors and particularly to juice extractor pressure cups.

The object of the invention is to provide means for preventing the fruit rind from adhering to the pressure cup after the juice has been extracted. There is a tendency on the part of the fruit to become lodged within the upper squeezing member or pressure cup, during the juice extracting operation, which necessitates removal of the rind and extracted pulp by the fingers of the operator contacting the pulpy part of the fruit or with the aid of a knife or spoon. This is unsanitary, and it is the object of this invention to obviate this objection.

I have found that by providing extra pressure exerting areas of limited size on the interior of the pressure cup, part of the fruit pulp is pressed into the holes in the lower squeezing member, causing the rind and extracted pulp to remain on the lower member when the pressure cup and lower squeezing member are separated. When the extracted fruit remains on the lower squeezing member, it is removable easily and the pulpy side of the rind need not be touched.

In the drawing:

Fig. 1 is an elevational side view of part of a fruit juice extractor, partly in section, showing squeezing members embodying the preferred form of my invention.

Fig. 2 is a bottom plan view of the pressure cup shown in Fig. 1.

Fig. 3 is a horizontal sectional view taken in the plane of the line 3—3 of Fig. 1.

Fig. 4 is a vertical sectional view of a pressure cup embodying a modified form of the invention.

Fig. 5 is a horizontal sectional view taken in the plane of the line 5—5 of Fig. 4.

Fig. 6 is a view similar to Fig. 3, showing a modified form of extra pressure exerting area on the inside of a pressure cup.

My invention is embodied in a fruit juice extractor of the non-rotary type, comprising a standard 10, cup support 11, discharge cup 12, lower squeezing member 13 and pressure cup 14. The cup 14 is movable relatively to member 13 by a rack 15 on which it is mounted. An operating handle is indicated at 16.

The squeezing members 13 and 14 in the preferred embodiment are frusto-conical in form, but the invention may be applied to other forms of squeezing members. The member 13 is provided with apertures 17 and if desired may have ribs 18 for preventing spreading of the fruit when subjected to pressure by the upper member 14.

The pressure cup 14 has a flat top wall 19, conical portion 20 and cylindrical member 21, the surfaces of which exert pressure on the fruit on the member 13. Extra pressure exerting areas are provided by means of four ribs 22 on the conical portion 20, which extend from the top wall 19 downwardly about two-thirds of the distance between the top and bottom of the cup. The ribs 22 are flat, as shown in Figs. 1, 2 and 3, but they may be rounded as shown at 23 in Fig. 6.

In the modification shown in Figs. 4 and 5, the extra pressure exerting areas are in the form of ribs 24 arranged circumferentially on the inner surface of the pressure cup.

The number and size of the ribs or projections may vary, but their area must be limited relatively to the pressure cup area. The provision of minimum extra pressure exerting areas, sufficient to cause small portions of the fruit to be pressed into the apertured member 13, is the optimum condition for efficient operation of the juicer. While I have shown extra pressure exerting areas in the form of elongated shallow ribs, it will be understood that these areas may be a plurality of shorter or longer ribs or projections, and the proportion of said areas to the total inner surface of the pressure cup is substantially as shown.

As shown in the drawing the ribs 22 and 24 are positioned to extend substantially midway between the top and bottom of the upper member 14, the ribs 22 extending somewhat below the median line and the ribs 24 being positioned somewhat above the median line.

The extra pressure exerting areas are designed to avoid cutting of the fruit rind or pressing into the fruit sufficiently to engage it and thereby retain it within the pressure cup. Means for holding the fruit stationary relatively to the pressure cup, while rotating the cup relatively to a lower squeezing member, are known to the art, but such means are foreign to my invention and do not serve to hold the fruit on the lower member when the pressure cup is raised.

The invention may be applied to squeezing members of varying shapes, such as the frusto-conical members shown, or the hemi-spherical forms known in the art.

Changes may be made in details of construction without departing from the scope of my invention.

I claim:

1. In a fruit juice extractor of the non-rotary type, a non-rotatable substantially frustro-conical lower squeezing member and a non-rotatable substantially frusto-conical upper pressure cup member adapted to receive fruit therebetween, one of said members being movable toward and away from the other, and means for holding the fruit on said lower member after extraction of juice therefrom and after said upper member has moved away from said lower member, said holding means comprising a series of inwardly projecting means of substantial length positioned to extend only over that portion of the inner conical surface of the cup substantially midway between the top and bottom thereof, and apertures in said lower member positioned to coact with said inwardly projecting means, whereby sufficient pressure may be exerted by said projecting means on said fruit to force a sufficient portion of said fruit into said aperture to hold said fruit on said lower member when said upper member is removed.

2. In a fruit juice extractor of the non-rotary type, a lower squeezing member and an upper pressure cup member adapted to receive fruit therebetween, one of said members being movable toward and away from the other, and means for holding the fruit on said lower member after extraction of juice therefrom and after said upper member has moved away from said lower member, said holding means including spaced elongated inwardly projecting rib means positioned to extend downwardly over only the upper portion of the inside of said upper pressure cup member, said apertures in said lower member positioned to coact with said rib means, the part of the cup member not equipped with said rib means being extended to that portion of the inner surface of the cup substantially midway between the top and bottom thereof, whereby sufficient pressure may be exerted by said projecting means on said fruit to force a sufficient portion of said fruit into said apertures to hold said fruit on said lower member when said upper member is removed.

ARTHUR W. SEYFRIED.